United States Patent
Monaco et al.

(10) Patent No.: US 12,511,441 B2
(45) Date of Patent: Dec. 30, 2025

(54) METHOD FOR MONITORING AN INTEGRITY OF SYSTEM BY A MONITORING DEVICE, COMPUTER PROGRAM PRODUCT AS WELL AS MONITORING DEVICE

(71) Applicants: MERCEDES-BENZ GROUP AG, Stuttgart (DE); ROBERT BOSCH GMBH, Stuttgart (DE)

(72) Inventors: Christopher Monaco, Sunnyvale, CA (US); Maximilian Muffert, Belmont, CA (US); Arun Das, San Jose, CA (US); Oleg Zhukov, San Carlos, CA (US); Leonid Koppel, Mountain View, CA (US)

(73) Assignees: MERCEDES-BENZ GROUP AG, Stuttgart (DE); ROBERT BOSCH GMBH, Stuttgart (DE)

( * ) Notice: Subject to any disclaimer, the term of this patent is extended or adjusted under 35 U.S.C. 154(b) by 37 days.

(21) Appl. No.: 18/718,704

(22) PCT Filed: Jan. 24, 2023

(86) PCT No.: PCT/EP2023/051658
§ 371 (c)(1),
(2) Date: Jun. 11, 2024

(87) PCT Pub. No.: WO2023/144131
PCT Pub. Date: Aug. 3, 2023

(65) Prior Publication Data
US 2025/0053689 A1   Feb. 13, 2025

(30) Foreign Application Priority Data

Jan. 26, 2022 (GB) .................................... 2200972

(51) Int. Cl.
*G06F 21/64* (2013.01)

(52) U.S. Cl.
CPC .................................... *G06F 21/64* (2013.01)

(58) Field of Classification Search
CPC .......... G06F 21/64; H04L 63/123; H04L 9/40
See application file for complete search history.

(56) References Cited

U.S. PATENT DOCUMENTS

| 7,725,483 | B2 * | 5/2010 | Poyourow | G06F 16/215 |
| | | | | 707/763 |
| 2003/0078923 | A1 * | 4/2003 | Voss | G06F 16/284 |

(Continued)

OTHER PUBLICATIONS

International Search Report issued May 2, 2023 in Intl. Appl. No. PCT/EP2023/051658.

(Continued)

*Primary Examiner* — Khalid M Almaghayreh
(74) *Attorney, Agent, or Firm* — MEDLER FERRO WOODHOUSE & MILLS PLLC

(57) ABSTRACT

The invention relates to a method for monitoring an integrity of a system by an monitoring system, comprising the steps of: Performing at least one hard constraint integrity check and depending on the hard constraint integrity check generating a Boolean value about the hard constraint integrity check by an electronic computing device of the monitoring system; Performing at least one soft constraint integrity check and depending on the soft constraint integrity check generating a floating P-value about the soft constraint integrity check by the electronic computing device; Generating a consensus value by rejecting outliers of the P-value and fusing non-outlier P-values to the consensus value by an estimator of the electronic computing device; and Monitoring the integrity depending on the Boolean value and the consensus value by the electronic computing device. Furthermore, the invention relates to a computer program product, as well as to a monitoring system.

8 Claims, 2 Drawing Sheets

(56) References Cited

U.S. PATENT DOCUMENTS

| | | | | |
|---|---|---|---|---|
| 2008/0235802 A1* | 9/2008 | Venkatesan | ............ | G06F 21/125 |
| | | | | 726/26 |
| 2014/0315181 A1* | 10/2014 | Frempong | ................ | G09B 7/02 |
| | | | | 434/362 |
| 2017/0185532 A1* | 6/2017 | Durham | .............. | G06F 11/1004 |
| 2017/0285976 A1* | 10/2017 | Durham | .................. | G06F 21/64 |
| 2021/0027186 A1 | 1/2021 | Sanchirico et al. | | |
| 2021/0133312 A1* | 5/2021 | Sugandhi | ................ | G06F 21/57 |

OTHER PUBLICATIONS

Decker, "Flexible Integrity Checking of Hard and Soft Constraints," Database and Expert System Application, 2009. Dexa '09. 20th International Workshop on, IEEE, Piscataway, NJ, Aug. 31, 2009, pp. 437-441.

Skog et al., "In-Car Positioning and Navigation Technologies—A Survey," IEEE Transaction On Intelligent Transportation Systems, IEEE, Piscataway, NJ, vol. 10, No. 1, Mar. 1, 2009, pp. 4-21.

Search Report issued Sep. 16, 2022 in GB Appl. No. 2200972.4.

\* cited by examiner

METHOD FOR MONITORING AN INTEGRITY OF SYSTEM BY A MONITORING DEVICE, COMPUTER PROGRAM PRODUCT AS WELL AS MONITORING DEVICE

FIELD OF THE INVENTION

The invention relates to the field of data systems. More specifically, the invention relates to a method for monitoring an integrity of a system by a monitoring device. Furthermore, the invention relates to a corresponding computer program product as well as to a monitoring system.

BACKGROUND INFORMATION

Safety-critical assistance, in particular in motor vehicles, must always maintain a high integrity. Integrity is defined as the measure of trust which can be placed in the correctness of the information supplied by the total system. It includes the ability of the system to provide timely and valid warnings to the user, so called alerts, when the system must not be used for the intended operation. The technical problem is that some estimation problem have ambitious constraints. If the wrong constraints are selected, the wrong model is used within the estimation of fault detection framework.

SUMMARY OF THE INVENTION

It is an object of the invention to provide a method, a computer program as well as a monitoring system for which an integrity of a system can be monitored in an efficient way.

This object is solved by a method, a computer program product as well as a corresponding monitoring system according to the independent claims. Advantageous forms of configuration are presented in the dependent claims.

One aspect of the invention relates to a method for monitoring an integrity of a system by a monitoring system. At least one hard constraint integrity check is performed and depending on the hard constraint integrity check a Boolean value about the hard constraint integrity check is generated by an electronic computing device of the monitoring system. At least one soft constraint integrity check is performed and depending on the soft constraint integrity check a floating P-value about the soft constraint integrity check is generated by the electronic computing device. A consensus value by rejecting outliers of the P-value and fusing non-outliers P-values to the consensus value is generated by an estimator of the electronic computing device. The integrity is monitored depending on the Boolean value and the consensus value by the electronic computing device.

Therefore, the system according to the state of the art are augmented for consistency checks. Specifically, it is designed to detect system-level faults caused by modeling errors. In particular, the invention provides a novel integrity monitoring framework for estimators thus susceptible to modeling errors. It contains two types of integrity, in particular of consistency, checks. Hard constraint integrity checks and soft constraint integrity checks.

The hard constraint integrity checks are suited for integrity checks that have distinct and none negotiable requirements. The output of hard constraint integrity checks is for example a Boolean pass or fail determination. The hard constraint can make an independently availability/integrity determination. Derived class examples for a hard constraint integrity check may be for example that the estimates uncertainty-based protection level is below the pre-set alert limit. Furthermore, checks that the final solution is mathematical valid may also be done by a hard constraint integrity check. Furthermore, a hard constraint integrity check may be performed when the system is within its operational design domain (ODD). Furthermore, checks, that the current soft constraint integrity checks are sufficient to rule out common error sources may be used by the hard constraint integrity checks.

The soft constraint integrity checks are suited well suited for robust estimators. Furthermore, they can augment conventional techniques and are compatible with diverse and incomplete measurements. For example for integrity checks in which the integrity exists in a continuous spectrum with no self-evident threshold. The output may be for example a floating point from 0 to 1 P-values or pseudo-P-values that indicate the estimated consistency with a cooperating measurement. The soft constraint integrity checks are well suited for robust estimators. For example, the consistency of residuals using conventional RAIM techniques can be calculated. The consistency of the system estimate with a perfectly independent and redundant measurement can be calculated, for example the P-value based on the residual between localization system and GNSS (global navigation satellite system) measurement pose estimates. Furthermore, the estimation consistency using residuals in the sensor reference frame may be calculated. The soft constraint integrity checks are well suited for robust estimators. Furthermore, they can augment conventional techniques and are compatible with diverse and incomplete measurements.

Therefore, to solve the aforementioned problem, this aspect of the invention offers an Integrity Monitoring framework that can augment current frameworks. It works on the system-level by detecting if the final estimate solution is at fault. This framework is developed to be generic enough to support a diverse set of consistency checks. Most importantly, it is developed to be compatible with consistency checks that are not susceptible to the same modeling errors as the estimation framework.

According to an embodiment a plurality of hard constraint integrity checks are performed and fused by the electronic computing device.

Furthermore, in another embodiment a plurality of soft constraint integrity checks are performed and evaluated by the estimator.

In another embodiment the estimator uses a median algorithm for detecting and rejecting outliers.

In another embodiment a threshold for P-value is used by the estimator for detecting and rejecting outliers.

According to another embodiment a hard constraint check is performed for integrity checks that have distinct and non-negotiable requirements.

In another embodiment a soft constraint check is performed for integrity checks in which the integrity exists in a continuous spectrum with no self-evident threshold.

In another embodiment the P-values are values between 0 and 1.

In particular the method is a computer-implemented method. Therefore, another aspect of the invention relates to a computer program product comprising means for performing a method according to the preceding aspect. Another aspect of the invention also relates to a computer-readable storage medium comprising at least a computer program product according to the preceding aspect.

Furthermore, the invention relates to a monitoring system for monitoring an integrity of a system, comprising at least one electronic computing device, wherein the monitoring system is configured for performing a method according to the preceding aspect. In particular, the method is performed by the monitoring device.

Another aspect of the invention relates to a motor vehicle comprising at least a monitoring system according to the preceding aspect.

Advantageous forms of the method are to be regarded as advantageous forms of the computer program product, the monitoring system as well as to the motor vehicle. The monitoring system as well as the motor vehicle therefore comprises means for performing the method.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWINGS

The novel features and characteristic of the disclosure are set forth in the appended claims. The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

The drawings show in.

In the figures the same elements or elements having the same function are indicated by the same reference signs.

DETAILED DESCRIPTION

Figure 1:
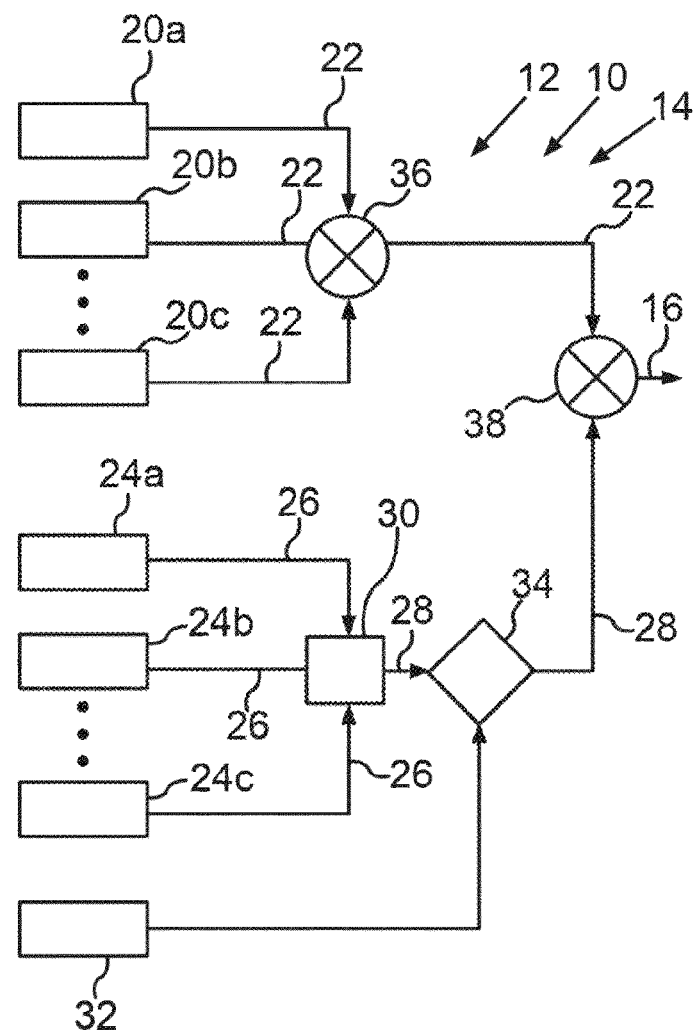
FIG. 1 a schematic block diagram according to an embodiment of the monitoring system.

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawing and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion so that a setup, device or method that comprises a list of components or steps does not include only those components or steps but may include other components or steps not expressly listed or inherent to such setup or device or method. In other words, one or more elements in a system or apparatus preceded by "comprises" or "comprise" does not or do not, without more constraints, preclude the existence of other elements or additional elements in the system or method.

In the following detailed description of the embodiment of the disclosure, reference is made to the accompanying drawing that forms part hereof, and in which is shown by way of illustration a specific embodiment in which the disclosure may be practiced. This embodiment is described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows a schematic block diagram according to a first embodiment of a monitoring system 10, in particular for a not shown motor vehicle 12. The monitoring system 10 comprises at least one electronic computing device 14. The monitoring system 10 is for monitoring an integrity 16, 18 of a system, in particular of a system of the motor vehicle 12.

The method for monitoring the integrity 16, 18 comprises at least the step of performing at least one hard constraint integrity check 20a, 20b, 20c and depending on the hard constraint integrity check 20a, 20b, 20c generating a Boolean value 22 about the hard constraint integrity check 20a, 20b, 20c is performed by the electronic computing device 14. At least one soft constraint integrity check 24a, 24b, 24c is performed and depending on the soft constraint integrity check 24a, 24b, 24c a floating P-value 26 is generated about the soft constraint integrity check 24a, 24b, 24c by the electronic computing device 14. A consensus value 28 by rejecting outliers of the P-values 26 and fusing non-outliers P-value 26 to the consensus value 28 is performed by an estimator 30 of the electronic computing device 14. The integrity 16, 18 is monitored depending on the Boolean value 22 and the consensus value 28 by the electronic computing device 14.

In particular FIG. 1 shows, that the Boolean values 22 of the hard constraint integrity checks 20a, 20b, 20c are fused in an And-block 36. The consensus-value 28 is checked against a P-value threshold in a block 34. The pre-checked consensus value 28 is fused in another And-block 36, wherein in this embodiment a Boolean availability 16 as the integrity 16, 18 is determined.

In particular FIG. 1 shows, that all soft-constraint integrity checks 24a, 24b, 24c and their P-values 26 are reported to the estimator 30, which is in particular a robust estimator. The goal of the robust estimator 30 is to reject outliers while fusing the P-value 26 into the consensus value 28. The consensus output corresponds to the final integrity score of the systems estimate. While it is intuitive to think of this robust estimator as a median calculation, the specifics of this estimator 30 is up to the end user. Integrity check outliers must be rejected towards faults or miss-alarms. For example, collaborating the system with faulty GNSS measurements could trigger false alarm. Similarly, incorrect data associations with residuals still near zero could cause missed alarms.

FIG. 1 shows in particular that the monitoring system 10 has all the context it needs to make a final availability determination, in particular the Boolean availability 16.

Figure 2:
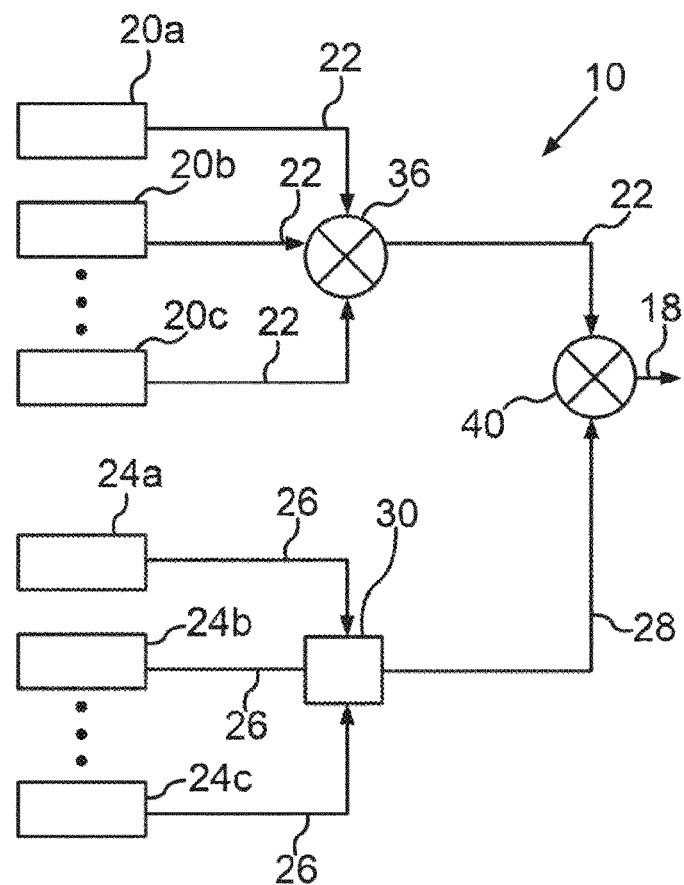
FIG. 2 another embodiment of a monitoring system.

In contrast to FIG. 1, FIG. 2 shows another embodiment of the monitoring system 10. Wherein in FIG. 2 the monitoring system 10 does not have all the context it needs, instead, it reports the system an integrity score 18 as the integrity 16, 18 to downstream modules. The integrity score may also be between 0 and 1 as a P-value 26. In particular, FIG. 2 shows, that the Boolean value 22 is multiplied with the consensus value 28 in a multiplier 40, wherein the integrity score 18 is generated.

Therefor the invention provides a framework that can augment proven model-based source-level techniques to also detect modeling errors. Therefore, these techniques should be used if possible. However, its estimation and fault detection framework could be susceptible to the same modeling errors. These modeling errors can be caused by many factors; they are most commonly they are caused by incorrect data associations. Therefor the invention provides a framework that can augment proven model-based source-level techniques, for example conventional RAIM, to also detect modeling errors."

Therefore, this invention provides a framework that can augment the model-based source-level techniques with a system-level consistency checks that are independent from those same modeling errors. It should be noted that this invention only provides a supporting framework—it must be deployed properly to fully realize its benefits.

The method provides the most generic Integrity Monitoring framework by depending on p-values 26 for its consistency analysis. Integrity monitoring depends on fault detection and fault detection depends on a consistency analysis. Since a consistency analysis compares corroborating measurements, all residuals must (eventually) share a common parameterization. This parameterization could include common reference frames, units, degrees-of-freedom, etc. Unfortunately, many transformations are infeasible or based on (sometimes-invalid) assumptions. Most limited systems are able to use a specific parameterization, but as the system becomes more multi-modal, the parameterization must become more generic.

Therefore, this invention depends on p-values 26 for its consistency analysis. The 0-1 p-values 26 are one of the most universal metrics possible. Almost any residual based on Bayesian measurements can be transformed into an equivalent p-value 26. Furthermore, this framework can integrate checks that produce p-values 26 with checks that produce "pseudo p-values." In this context, "pseudo p-values" are other 0-1 consistency scores. In general, a p-value of 0 indicates a 0% probability that two estimates are consistent while a p-value of 1 indicates a 100% probability. This allows the framework to also be compatible with integrity checks that are based on non-Bayesian, non-parametric, numerical, and/or ad-hoc techniques.

REFERENCE SIGNS

10 Monitoring system
12 Motor vehicle
14 Electronic computing device
16 Boolean value
18 Integrity score
20 Hard constraint integrity check
22 Boolean value
24 Soft constraint integrity check
26 P-value
28 Consensus value
30 Estimator
32 P-value threshold
34 Block
36 End-block
38 End-block
40 Multiplier

The invention claimed is:

1. A method for monitoring an integrity of a system by a monitoring system, the method comprising:
performing at least one hard constraint integrity check for integrity checks that have distinct and non-negotiable requirements, and depending on the at least one hard constraint integrity check, generating a Boolean value about the at least one hard constraint integrity check by an electronic computing device of the monitoring system;
performing at least one soft constraint integrity check for integrity checks in which the integrity exists in a continuous spectrum with no self-evident thresholds, and depending on the at least one soft constraint integrity check, generating a floating P-value about the at least one soft constraint integrity check by the electronic computing device;
generating a consensus value by rejecting outliers of the P-value and fusing non-outlier P-values to the consensus value by an estimator of the electronic computing device; and
monitoring the integrity depending on the Boolean value and the consensus value by the electronic computing device.

2. The method according to claim 1, wherein:
a plurality of hard constraint integrity checks are performed and fused by the electronic computing device.

3. The method according to claim 1, wherein:
a plurality of soft constraint integrity checks are performed and evaluated by the estimator.

4. The method according to claim 1, wherein:
the estimator uses a median algorithm for detecting and rejecting outliers.

5. The method according to claim 1, wherein:
a threshold for a P-value is used by the estimator for detecting and rejecting outliers.

6. The method according to claim 1, wherein:
the P-values are values between 0 and 1.

7. A non-transitory computer readable storage medium having a program comprising instructions that perform a method comprising:
performing, by an electronic device of a monitoring system, at least one hard constraint integrity check for integrity checks that have distinct and non-negotiable requirements, and depending on the at least one hard constraint integrity check, generating a Boolean value about the at least one hard constraint integrity check;
performing, by the electronic device, at least one soft constraint integrity check for integrity checks in which integrity exists in a continuous spectrum with no self-evident thresholds, and depending on the at least one soft constraint integrity check, generating a floating P-value about the at least one soft constraint integrity check;
generating, by an estimator of the electronic device, a consensus value by rejecting outliers of the P-value and fusing non-outlier P-values to the consensus value; and
monitoring, by the electronic device, the integrity depending on the Boolean value and the consensus value.

8. A monitoring system, comprising:
an electronic computing device configured to
perform at least one hard constraint integrity check for integrity checks that have distinct and non-negotiable requirements, and depending on the at least one hard constraint integrity check, generating a Boolean value about the at least one hard constraint integrity check, perform at least one soft constraint integrity check for integrity checks in which integrity exists in a continuous spectrum with no self-evident thresholds, and depending on the at least one soft constraint integrity check, generating a floating P-value about the at least one soft constraint integrity check, generate, by an estimator, a consensus value by rejecting outliers of the P-value and fusing non-outlier P-values to the consensus value, and monitor the integrity of a system depending on the Boolean value and the consensus value.

* * * * *